Patented Feb. 13, 1923.

1,445,603

UNITED STATES PATENT OFFICE.

JACOB S. ROBESON, OF PENNINGTON, NEW JERSEY, ASSIGNOR TO J. S. ROBESON, INC., OF WILMINGTON, DELAWARE, A CORPORATION OF DELAWARE.

TREATMENT OF SULPHITE CELLULOSE LIQUORS.

No Drawing. Application filed September 24, 1920. Serial No. 412,536.

*To all whom it may concern:*

Be it known that I, JACOB S. ROBESON, a citizen of the United States, and a resident of Pennington, in the county of Mercer and State of New Jersey, have invented certain new and useful Improvements in the Treatment of Sulphite Cellulose Liquors, of which the following is a specification.

Sulphite cellulose liquor resulting from the treatment of wood pulp is of an unknown chemical composition but is often described as a calcium-magnesium lignosulfonate. It is an organic complex containing sulphur, some of which is in what may be termed a loosely combined condition or as free $SO_2$. As discharged from the digester, it is slightly acid, some of the acidity being due to an inoganic acid or acids.

It is well known that sulphite cellulose liquors contain some fermentable material. It has been generally believed that fermentation could not successfully be completed in the presence of either or both sulphurous acid and sulphites. For this reason it has been common practice to neutralize, usually with lime, all sulphite cellulose liquor intended for fermentation use. Such lime treatment results in disadvantages and losses by reason of the lime organic compound which separates as a bulky precipitate if a sufficient amount of lime be added to completely neutralize the liquor, and the liquor is so changed as to materially decrease its adhesiveness. Furthermore, the neutralized liquor still contains acid sulphites.

Under the conditions, fermentation is conducted at a disadvantage, and is apt to be slow. Great care must be exercised in order to have it continue. Neutralized liquor of this character is not very readily fermentable and can stand in the air for a considerable period of time without any fermentation taking place unless ferments are especially introduced.

The ordinary sulphite cellulose liquors are very sensitive to heat and great care must be taken during evaporation to keep the temperature below some certain critical point, often said to be about 230° F., in order to prevent burning the liquor and thereby causing acid formation and decomposition of the complex and loss of colloids, etc. In order to increase adhesiveness, prevent loss of valuable ingredients, promote fermentation, facilitate evaporation and concentration, and make a better tanning material, the loosely bound sulphur must be removed or firmly bound to the complex.

In my improved process, I accomplish this by thoroughly oxidizing the liquor. This oxidation or partial decomposition so changes the condition or character of the liquor that it may be made decidedly basic without the formation of an excessive precipitate of organic alkali salt. It also permits of the liquor being neutralized and evaporated to a syrup or a powder at a higher temperature and without further decomposition and the self-accelerating formation of acids destructive to the organic complex, which occurs when concentration takes place without neutralization. There is also avoided the excessive formation of scale-forming compounds which cause much trouble in the evaporating apparatus when alkali or neutralizing agents are added to the liquor in the manner heretofore employed.

While I may employ any alkali, such as the oxides or salts of lime, magnesia, soda, potash, etc., I have found that if magnesia, produced by the calcining of the ordinary magnesium carbonate, is used, the excess added over that needed to make the liquor basic is precipitated as the hydroxide instead of an organic compound, and the hydroxide may be recovered and used for various purposes. By preventing this bulky precipitate of organic compound which ordinarily occurs on addition of excess of lime, the resultant thick liquor or powder is from 10% to 25% more adhesive. The presence of an excess of the alkali apparently increases the colloidal character of the liquor and the adhesiveness. The increase in adhesiveness is probably due to the increase in colloids.

I have found that liquor thoroughly and completely oxidized as hereinafter set forth may be evaporated at temperatures up to 300° F. without danger of injury or loss. The oxidized liquor of my process is very easily fermented. Under ordinary conditions and in summer weather, it will start active fermentation within twenty-four to forty-eight hours, and without the special introduction of yeast. This difference in the ease with which the liquor ferments not only indicates a different character of liquor, even though the fermentation is not to be utilized, but it provides a means for the economical production of alcohol by reason of this ease of fermentation.

In practicing my process, I take the sulphite cellulose liquor, sometimes called sulphite waste liquor, just as it comes from the digester or after it has stood in storage tanks, as it ordinarily does in commercial practice. For economy in operation, it is best not to take any liquor of less than 5° Bé. at 60° F., although, of course, it can be treated by this process at lower densities, if desired.

As a very important step in my improved process, I spray or mist the liquor into the air so as to thoroughly and completely oxidize it, and at the same time evaporate a portion of the water and reduce the bulk. The spraying may be accomplished by any desired apparatus, but preferably by the mere discharge under sufficient pressure through a type of nozzle which will cause a fine mist to be produced, and under conditions permitting the collection of the un-evaporated liquor as it falls, and free circulation of atmospheric air.

This brings about a very rapid and extremely thorough intermixing of the air and liquor so that all of the free $SO_2$ and the loosely combined sulphur are almost instantly permitted to escape or are oxidized to firmly bound condition.

The liquor is then preferably made basic by the addition of any material suitable for that purpose. As a preferred material, I employ calcined magnesite. After the addition of this material any precipitate or excess of solid material is removed. Although this may in some cases be accomplished in whole or in part in settling tanks, I preferably run the liquor through a centrifugal filter. Thereafter, the liquor may be concentrated to about 1.26 Sp. gr. and sold as such, or the concentration may be continued to dryness and the product put up or sold in powder form.

The resulting thick liquor or powder is more adhesive than products of the same general nature heretofore produced from sulphite cellulose liquor by other methods, and the evaporation may be carried on at a higher temperature without danger of "burning".

Instead of carrying the concentration of the liquor down to the desired dryness or thickness after oxidation and filtration, I may permit or promote fermentation before concentration or after partial concentration.

After oxidation, as above described, the liquor may be permitted to stand and ferment or the fermentation may be promoted by the addition of any suitable material, such as a yeast food. If the main product desired is alcohol resulting from such fermentation, it is preferable to add the alkali to render the liquor basic after oxidation, but such addition is not necessary, as the oxidation places the liquor in condition for fermentation without the usual alkali treatment. Preferably the concentration is begun before the fermentation, for instance, I may employ a multiple-effect evaporator to concentrate the liquor so that there will be a minimum bulk of liquor in which the fermentation takes place and proceeds satisfactorily. For instance, the liquor after oxidation and with or without alkali treatment, may be concentrated to about 1.11 to 1.15 Sp. gr., which results in the removal of about 75% of the water. If the operation is being conducted in a quadruple effect vacuum apparatus, then the liquor may be withdrawn from the second effect, taken to fermentation vats, and cooled down by counter-current apparatus, thereby giving up its heat to and raising the temperature of the fermented liquor containing the alcohol and which is being returned to the third effect of the evaporator. This third effect may be provided with a dephlegmator. The fermented liquor might be filtered to remove dead yeast if necessary and directed to a still for the removal of the alcohol and thereafter returned to the evaporator to complete the concentration of the mother liquor to 1.26 Sp. gr. or even to dryness. The alcohol-containing distillate may be treated in the usual manner to purify the same.

It is important to note that the liquor, after the fermentation and removal of the alcohol, is just as good for use in the production of the ordinary products of sulphite cellulose liquor as it would be without such fermentation and alcohol removal. In fact, if the concentrated liquor is to be used for tanning purposes, and especially as a "loading" agent, the percentage of material absorbed by hide powder is somewhat increased.

The process so far as the production of alcohol and the concentration of the mother liquor is concerned, is particularly economical since the heat required for the first half of the concentration is used without any extra cost to reduce the volume of the liquor that is to be fermented to the point where investment for storage and fermentation tanks, buildings, etc., is small enough to permit of the economical operation, while the heat required for the completion of the concentration can at the same time be used to distill the alcohol.

In the first effect of the evaporator, steam at a pressure of between 50 and 60 pounds to the inch may be employed, although it is advisable that the pressure be around 20 to 25 pounds. The steam pressure in the second, third and fourth effects of the apparatus will be of gradually reduced pressure, as is usually practised in vacuum evaporation work.

Having thus described my invention, what I claim as new and desire to secure by United States Letters Patent is:

1. The process of treating sulphite cellulose liquor, including oxidizing, partially concentrating and permitting escape of volatile acids by spraying liquor as a fine mist into the air, and collecting the unevaporated liquor for further treatment.

2. The process of treating sulphite cellulose liquor, including spraying in a fine mist into the air the hot liquor as it comes from the digester and thereby oxidizing, and partially concentrating the liquor and permitting escape of volatile acids therefrom, and collecting the unevaporated liquor for further treatment.

3. The process of making an adhesive or binder which includes spraying sulphite cellulose liquor as a fine mist into the air to oxidize and partially concentrate the same, and permit the escape of free volatile acid, collecting the unevaporated oxidized liquor, adding neutralizing agent, and further concentrating.

4. The process of making an adhesive or binder which includes spraying hot sulphite cellulose liquor as a fine mist into the air, collecting the unevaporated liquor, adding neutralizing agent to excess, filtering out the insoluble portions, and further concentrating.

5. The process of making an adhesive or binder which includes oxidizing sulphite cellulose liquor by spraying the same into the air, and thereafter further concentrating the oxidized liquor.

6. The process of making an adhesive or binder including oxidizing sulphite cellulose liquor by spraying the same into the air, neutralizing the oxidized and concentrated liquor, filtering, and further concentrating.

7. The process of making an adhesive or binder including spraying sulphite cellulose liquor into the air, to thereby effect a brief but thorough exposure of the ingredients to the action of the air, collecting the unevaporated portion of the liquor, adding a neutralizing agent, removing or altering certain of the ingredients by fermentation, and concentrating the remainder.

8. The process of making an adhesive or binder from sulphite cellulose liquor, including removing or altering certain of the ingredients of the liquor by spraying into the air, altering certain of the ingredients by the action of a base or neutralizing agent, removing or altering certain of the ingredients by fermentation, and concentrating the liquor so treated.

9. The process of treating sulphite cellulose liquor including oxidizing the liquor by spraying into the air, concentrating with heat, cooling, fermenting, reheating by the heat extracted in the previous step of cooling, and further concentrating with removal of the alcohol resulting from fermentation.

10. The process of treating sulphite cellulose liquor including oxidizing by spraying into the air, neutralizing with magnesia, concentrating, fermenting the concentrated liquor, and further concentrating with removal of alcohol.

11. The process of treating sulphite cellulose liquor including oxidizing by spraying into the air, neutralizing, concentrating, fermenting the concentrated liquor, and further concentrating with removal of alcohol.

12. An adhesive resulting from the treatment of sulphite cellulose liquor by oxidizing by spraying into the air and further concentration of the oxidized liquor.

13. An adhesive prepared from sulphite cellulose liquor without the removal of organic matter and resulting from spraying the liquor into the air, neutralizing with magnesia and concentrating.

14. A new sulphite cellulose liquor product resulting from thoroughly and completely oxidizing the liquor by spraying into the air, neutralizing the oxidized and concentrated liquor with magnesia, filtering and further concentrating.

15. A new sulphite cellulose liquor product in which certain of the ingredients of the sulphite cellulose liquor have been removed or altered by spraying into the air, certain ingredients have been altered by the action of a neutralizing agent, and certain of the ingredients have been removed or altered by fermentation.

16. A new sulphite cellulose liquor product in which certain of the ingredients of the sulphite cellulose liquor have been removed or altered by spraying into the air, and certain ingredients have been altered by the action of a neutralizing agent, but without removal or precipitating of any appreciable amount of the organic constituents.

17. A new sulphite cellulose liquor product resulting from spraying the liquor into the air, neutralizing the unevaporated portion of the liquor, removing or altering certain of the ingredients by fermentation, and concentrating.

JACOB S. ROBESON.